UNITED STATES PATENT OFFICE.

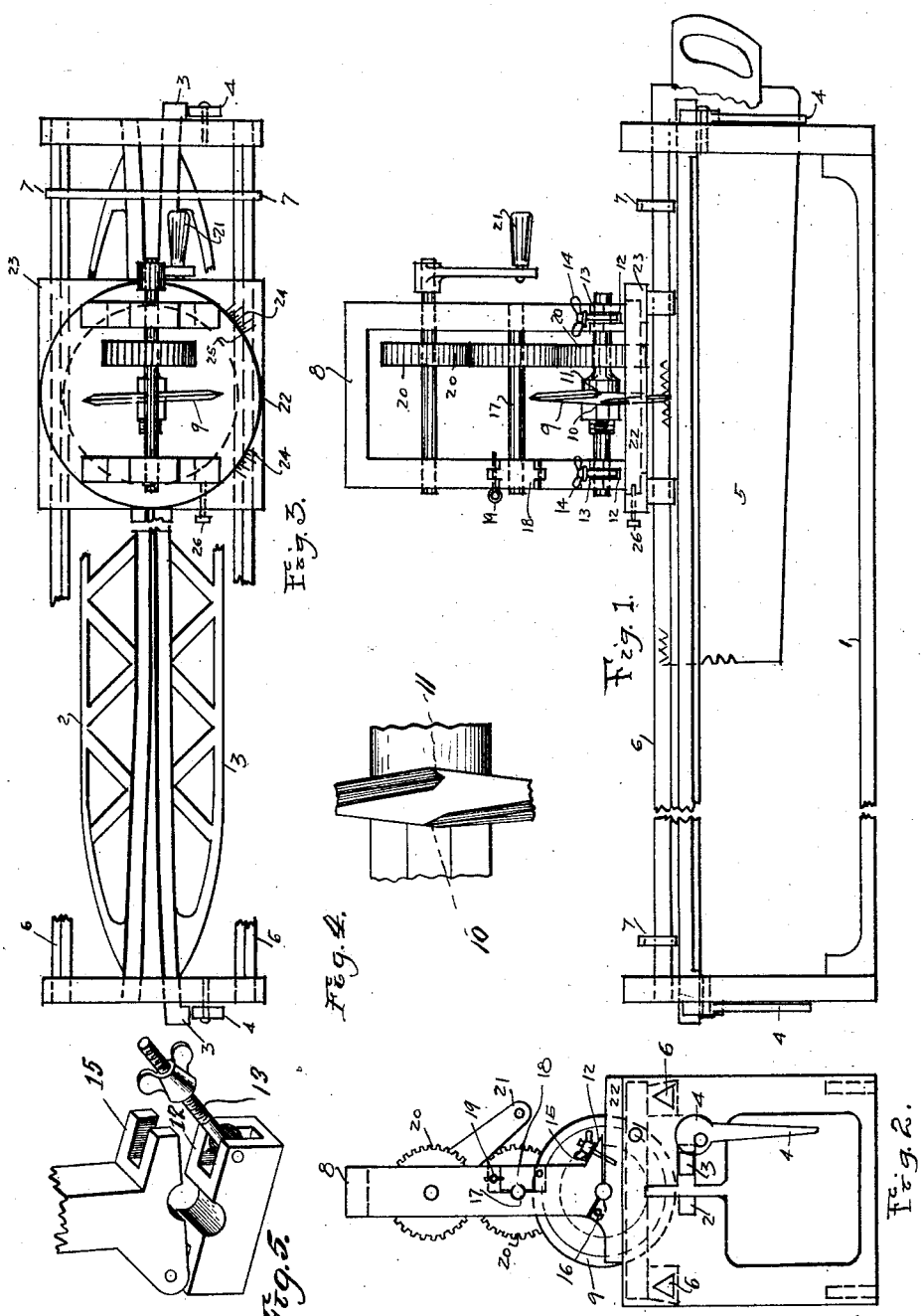

OLOF J. WESTERDAHL, OF SEATTLE, WASHINGTON.

SAW-FILING MACHINE.

1,406,512.  Specification of Letters Patent.  Patented Feb. 14, 1922.

Application filed November 9, 1920. Serial No. 422,777.

*To all whom it may concern:*

Be it known that I, OLOF J. WESTERDAHL, a citizen of the United States, residing at Seattle, in the county of King and State of Washington, have invented a new and useful Saw-Filing Machine, of which the following is a specification.

My invention relates to improvements in saw filers in which a file—disc-like in form and having a split edge portion the ends of which extend laterally—mounted within a carrier, is made to travel along the teeth of a hand saw and file the teeth thereof; and the objects of my improvement are to provide mechanism whereby the actuation of the file by suitable gearing and connections will cause it to file one side of a tooth of a saw and automatically advance from tooth to tooth, at the same time filing an edge, with means provided for the return of the file along the saw in a similar manner, thereby filing the other sides of the teeth of the saw.

I attain these objects by the mechanism illustrated in the accompanying drawing, wherein—

Figure 1 is a side elevation of the machine, with sections broken away, indicating a saw in position for filing; Fig. 2 is an end elevation of the device, looking from the end farthest removed from the saw; Fig. 3 is a top view with the supports for the file carrier broken away, for the purpose of better illustrating the mechanism for holding the saw in operative position; Fig. 4 is an enlarged view of a section of the file, particularly illustrating its terminal points; Fig. 5 is a perspective, enlarged, showing one of the hinged journal bearings of the file, the same being partly opened to better indicate the means for detachably connecting the file and its shaft therewith.

Referring to the drawings, 1 designates the framework of the body of the machine, which can be of any suitable form or design. Fixedly connected with the upper portion of the body is the member 2, and associated with said portion is the member 3, the extremities of which extend through either end of the framework and are slidably engaged therein. These two members are of open construction as indicated, but such as to give lightness combined with rigidity. Located at each end of the frame the cam levers 4 operate against the member 3, as shown in Fig. 3. The mechanism just described together comprises a support for a saw 5, to be filed.

The inner adjacent edges of the members 2 and 3, when in an inoperative position as indicated in Fig. 3, are closer together at their intermediate portions than at the ends. When a saw is placed between these members and the pressure of the cam levers applied, said edges will be in planes substantially parallel with the saw, but extreme pressure will be exerted on the saw in its central portion, thus effectually holding it in position. Mounted on the top portion of the frame are two oppositely located supports 6. These are indicated in Fig. 2 as being triangular in cross-section. They may be round in cross-section, or otherwise, as may be deemed expedient. 7 designate two cross pieces extending between the supports and loosely and slidably engaged thereon, the functions of which are to gauge and limit the upturned travel of the saw when it is placed in operative position within its support, the said cross pieces coacting together to indicate that the teeth of the saw are in a horizontal position and properly placed for grinding. The operator achieves this result by pressing the saw upward against the gauges to the limit of their movement vertically.

Slidably mounted on the supports 6 is the file carrier and its connections, comprising the frame 8, which can be of any form deemed desirable. The file 9 is mounted on a shaft and journaled in the frame. It is disc-like in form and provided with a split edge portion having laterally extending points, as indicated at 10 and 11. The point 10 is the section of the file first to enter between the teeth and it is provided with a sharper point than the point 11. The point 11 can be made, if desired, slightly wider than the intermediate edge of the file. This construction permits of an easy entrance of the file between the teeth, and the file, when it leaves said space, accommodating itself to the enlargement made by the cutting and at the same time cutting to a greater degree than at the beginning or intermediate portion of the file. At 12 the carrier is provided with slots on either side in which are pivotally mounted eye bolts 13, carrying winged nuts 14. At 15 the frame of the carrier, on either side, has an angular portion on a plane with the surface of the section of the carrier at 12, Fig. 2, said portion carrying complementary slots to those in which said bolts are mounted. When said winged nuts, provided with washers if desired, are tightened up as indicated in Fig. 2, said nuts or washers contact with the portions 12 and 15. The rear of the carrier is provided with the hinge 16, at either side. This mechanism permits the file, carrying its shaft, to be easily removed from the carrier by unscrewing the winged nuts, letting the bolts fall forward and throwing the carrier back on its hinges. It is obvious that a file can be inserted by movements the reverse of those indicated. The center gear wheel is mounted on the shaft 17, and is removable from the carrier through the instrumentality of a hinged section in the carrier designated as 18, Fig. 2, and said section held in place by the pin 19, in Fig. 1.

The drawings illustrate the mechanism as actuated by three gear wheels 20, and the handle and crank arm 21, in manual operation. If desired, different gearing and motive power may be applied. The carrier 8 is provided at its lower portion with a circular section 22 which is adapted to rotate within the base portion 23, for the purpose of reversing the carrier and the file when the end of the saw is reached after filing one way, and to permit the filing of the teeth of the saw on the return of the same. The scales 24 on the base, Fig. 3, in connection with the mark 25 on the circular section, indicate to the operator the proper position for the carrier either in its normal or reversed position, and the pin 26, controlled by a spring, located in the base and operating in recesses in the circular section, holds the carrier and connections securely in either position.

In operation, a hand saw is placed in the machine as heretofore described. A file of a size adapted to the teeth of the saw, having been placed in operative position in the carrier and against the first tooth of the saw, is rotated, causing it to file said tooth, and the laterally extending point 11 of the file, causing the carrier and connections to slide along the rails 6 and advance the file to the next tooth, thus progressively grinding the teeth on one side until the end of the saw is reached. The reversal of the mechanism as hereinbefore described, and the rotation of the file, will accomplish the return of the carrier and connections and the filing of the other edges of the teeth. While the device is operative as just described, to accomplish a more accurate contact of the file with the surfaces to be ground on the return, if desired, I will also provide a file of suitable size wherein the terminal points 10 and 11 occupy reversed positions from those indicated in the drawings, the interchange to be effected when the first file reaches the end of the saw. I will also provide a plurality of files of different sizes and mounted at the proper angles adapting them to grind the teeth of any ordinary hand saw. It is obvious that changes in and modifications of the construction described may be made without departing from the spirit of my invention or sacrificing its advantages.

I claim:

1. A device of the class described, comprising a frame, a support within the frame adapted to hold a saw in rigid position for filing, a carrier slidably connected with the frame, a file journaled in the carrier, having a disc-like form and provided with an integral cutting edge separated into two laterally extending and adjacent terminal points, one point narrower than the intermediate edge of the file betwen said terminals, and the other point slightly wider than said edge, said file adapted to enter between the teeth of a saw located in the support and when rotated to file an edge thereof, to advance said carrier and file to operative position against the next tooth of said saw and progressively file one side of all of said teeth, means for rotating the file, and means for reversing the file and carrier, whereby the same may be placed and maintained in operative position for likewise filing the opposite edges of said teeth.

2. In a saw filer having an upright frame, a support for holding a saw in operative position for filing, comprising a member fixedly attached to the frame and provided with a longitudinally extending inner edge slightly convex in form, a second member provided with a longitudinally extending inner edge slightly convex in form and located adjacent to said edge of the first member, said members occupying substantially a horizontal plane, the free ends of the second member extending through and beyond the ends of the frame and slidably engaged therewith, a cam lever located at each end of the frame and associated with each end of the second member, whereby pressure may be applied to a saw placed between said members and the saw supported in fixed position.

3. In a device of the class described having a frame and a support adapted to hold a saw in an immovable position for filing, a plurality of oppositely located and longitudinally extending supports mounted on the upper portion of the frame, a plurality of transversely extending gauges slidably mounted on the supports adapted to limit the upward movement of said saw when placed in operative position, a carrier rotatably mounted on a base and slidably engaged with said supports, a file rotatably and detachably connected with the carrier, said file being circular in form and having a circumferentially extending integral cutting edge divided into two laterally extending and oppositely disposed terminal points, one of which is slightly wider than the intermediate edge between said terminals, means whereby said carrier may be reversed and be operative in said reversed position.

4. A saw file of disc-like form having a circumferentially extending integral cutting edge separated into two laterally extending and oppositely disposed terminal points, one point narrower than the intermediate edge of the file between said terminals, and the other point slightly wider than said edge.

5. In a device of the class described having a frame and a support adapted to hold a saw rigidly for filing, the combination of a plurality of oppositely located and longitudinally extending supports mounted on the upper portion of the frame and in spaced parallel relation, a transversely extending gauge slidably mounted on the supports adapted to limit the upward movement of said saw when placed in operative position, a carrier rotatably mounted on a base and slidably engaged with said supports, a file rotatably and detachably connected with the carrier, said file being circular in form and having a circumferentially extending integral cutting edge separated into two laterally extending and oppositely disposed terminal points, means whereby said carrier may be reversed and operatively maintained in said reversed position.

OLOF J. WESTERDAHL.